United States Patent Office 2,701,259
Patented Feb. 1, 1955

2,701,259

O.O-DIMETHYL-O-4-NITRO-3-CHLOROPHENYL THIOPHOSPHATE

Gerhard Schrader, Opladen, Germany, assignor to Farbenfabriken Bayer Aktiengesellschaft, Leverkusen, Germany, a corporation of Germany No Drawing. Application April 29, 1953,
Serial No. 352,030

Claims priority, application Germany May 2, 1952

1 Claim. (Cl. 260—461)

The present invention relates to an ester of thionophosphoric acid hitherto not described in the literature; more particularly it relates to O.O-dimethyl-O-4-nitro-3-chlorophenyl thiophosphate and to a method of preparing this ester.

A great number of neutral esters of phosphoric and thiophosphoric acid is known. In recent years O.O-dialkyl-O-arylphosphates and -thiophosphates gained particular importance as insecticides. The 4-nitrophenyl compounds proved to be of outstanding effect. Compounds of this type were also synthesized which contained the nitro group in another position than the 4-position and contained also further substituents besides the nitro group, e. g. chlorine. However, all these modified compounds did not become of any practical importance, since they showed no advantage over the 4-nitrophenyl compounds.

It has now been found that O.O-dimethyl-O-4-nitro-3-chlorophenyl thiophosphate hitherto not described occupies a unique position. For this compound possesses on the one hand a very strong insecticidal action which is certainly not inferior to that of the corresponding 4-nitrophenyl compounds, if not superior thereto, while on the other hand it is distinguished by a very low toxicity towards warm-blooded animals. This is very surprising and could not be foreseen. The low toxicity towards warm-blooded animals is of extraordinary advantage for the practical application of this compound, since it means a close approach to the long desired state of having a highly insecticidal compound without or at least with reduced hazards of toxicity.

The new compound is obtainable by reacting in known manner O.O-dimethyl chlorothionophosphate with 4-nitro-3-chlorophenol. Various methods to carry out this reaction are known from numerous publications.

The following table shows the toxic and insecticidal values of the known, practically used thiophosphates and of the new O.O-dimethyl-O-4-nitro-3-chlorophenyl thiophosphate.

Table

| Compound | Toxic effect on rats per os lethal dose | effect on aphids | |
|---|---|---|---|
| | | concentration | dead |
| (1) $(C_2H_5O)_2P(S)-O-C_6H_4-NO_2$ | Mg./kg. 7 | Percent 0.001 | Percent 100 |
| (2) $(CH_3O)_2P(S)-O-C_6H_4-NO_2$ | 15 | 0.001 | 100 |
| (3) $(CH_3O)_2P(S)-O-C_6H_3(Cl)-NO_2$ | 500 | 0.001–0.0005 | 100 |

From the table results that the new compound in comparison with the practically used O.O-diethyl- and O.O-dimethyl-O-4-nitrophenyl thiophosphates has at least the same insecticidal effect and an about 30 to 70 times lower toxic effect.

The present invention is illustrated by the following examples without, however, being limited thereto:

Example 1

87 grams of 4-nitro-3-chlorophenol are suspended in 300 cc. of methyl ethyl ketone together with 80 grams of powdered and sifted potassium carbonate with the addition of 2 grams of copper powder. With stirring and refluxing 81 grams of O.O-dimethyl chlorothionophosphate are added at 65° C. The reaction is noticeably exothermic. To complete the reaction the mixture is kept for one hour at 70° C.; thereafter the separated salt is removed by filtration. The filtrate is freed from solvent by vacuum distillation. For further purification the remaining oil is heated for 10 minutes under a pressure of 1 millimeter to 90° C. Thus 132 grams of O.O-dimethyl-O-4-nitro-3-chlorophenyl thiophosphate are obtained as a light yellow water-insoluble oil. Yield: 89 percent of theory.

Example 2

87 grams of 4-nitro-3-chlorophenol are dissolved in 100 cc. of methanol at 40° C. 110 cc. of sodium methylate solution corresponding to one-half mol of sodium are added. Into the solution thus prepared 81 grams of O.O-dimethyl chlorothionophosphate are dropped with stirring at 35 to 40° C. The reaction is exothermic. The reaction mixture is now stirred for half an hour at 35° C., then the sodium chloride is removed by filtration and the solvent from the filtrate by distillation. The remaining oil is washed twice with dilute sodium bicarbonate solution and then dried with anhydrous sodium sulfate. For further purification the crude product is kept for 10 minutes under a pressure of 1 millimeter at 90° C. 115 grams of O.O-dimethyl-O-4-nitro-3-chlorophenyl thiophosphate are thus obtained. Yield: 79 percent of theory.

I claim:
O.O-dimethyl-O-4-nitro-3-chlorophenyl thiophosphate.

References Cited in the file of this patent

UNITED STATES PATENTS

| 2,520,393 | Fletcher | Aug. 29, 1950 |
| 2,605,279 | Edwards | July 29, 1952 |
| 2,657,229 | Orochena | Oct. 27, 1953 |
| 2,664,437 | Fletcher | Dec. 29, 1953 |